US008255690B2

(12) United States Patent
Wiseman et al.

(10) Patent No.: US 8,255,690 B2
(45) Date of Patent: *Aug. 28, 2012

(54) APPARATUS AND METHOD FOR GROUP SESSION KEY AND ESTABLISHMENT USING A CERTIFIED MIGRATION KEY

(75) Inventors: Willard M. Wiseman, Tigard, OR (US); Brett G. McKown, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/484,011

(22) Filed: Jun. 12, 2009

(65) Prior Publication Data

US 2009/0249073 A1    Oct. 1, 2009

Related U.S. Application Data

(63) Continuation of application No. 11/173,486, filed on Jun. 30, 2005, now Pat. No. 7,577,258.

(51) Int. Cl.
*H04L 29/06* (2006.01)
*H04L 9/32* (2006.01)

(52) U.S. Cl. .................. 713/171; 713/168; 713/150

(58) Field of Classification Search .................. None
See application file for complete search history.

(56) References Cited

U.S. PATENT DOCUMENTS

| | | | |
|---|---|---|---|
| 2010/0031047 A1* | 2/2010 | Coker et al. | 713/176 |
| 2011/0023106 A1* | 1/2011 | Murotake et al. | 726/11 |
| 2011/0302415 A1* | 12/2011 | Ahmad et al. | 713/168 |

OTHER PUBLICATIONS

Samfat, D., et al., "A method providing identity privacy to mobile users during authentication," Mobile Computing Systems and Applications, 1994, Proceedings, Workshop on Dec. 8-9, 1994, pp. 196-199.
Gligor, V.D., et al., "Object Migration and Authentication," Software Engineering, IEEE Transactions on vol. SE-5, Issue 6, Nov. 1979, pp. 607-611.
Zengxiang, Li, et al., "Federate Migration in a Service Oriented HLA RTI," Distributed Simulation and Real-Time Applications, 2007, DS-RT 2007, 11$^{th}$ IEEE International Symposium, Oct. 22-26, 2007, pp. 113-121.
https://www.sdn.sap.com/irj/scn/thread?messageID=5891178#5891178; year 2008.
Gunupudi, et al., "Random Oracle Instantiation in Distributed Protocols Using Trusted Platform Modules," year 2007.

* cited by examiner

*Primary Examiner* — David Y Jung
(74) *Attorney, Agent, or Firm* — Blakely, Sokoloff, Taylor & Zafman LLP

(57) ABSTRACT

A method and apparatus for group session key and establishment using a certified migration key are described. In one embodiment, the method includes exporting of a protected certified migration key (CMK) to a target platform. In one embodiment, exporting of the protected CMK requires that the target platform is authorized for participation in a group and has a storage key, including attributes that comply with the group security policy. Once the protected CMK is exported, in one embodiment, a group master key is encrypted with a public portion of the CMK to form a protected group master key. Subsequently, the protected group master key is transmitted to the target platform. In one embodiment, possession of the group master key enables the target platform to participate in a secure group communication session. Other embodiments are described and claimed.

10 Claims, 7 Drawing Sheets

APPARATUS AND METHOD FOR GROUP SESSION KEY AND ESTABLISHMENT USING A CERTIFIED MIGRATION KEY

CROSS-REFERENCE TO RELATED APPLICATIONS

This application is a continuation of U.S. patent application Ser. No. 11/173,486, filed Jun. 30, 2005, which issued as U.S. Pat. No. 7,577,258, on Aug. 18, 2009, the entire contents of which are hereby incorporated by reference herein.

FIELD

One or more embodiments relate generally to the fields of data security, information protection and user privacy. More particularly, one or more of the embodiments relate to a method and apparatus for group session key and establishment using a certified migration key.

BACKGROUND

In a world increasingly influenced by the existence of networks connecting a widespread array of computing resources, the topics of data security, information protection and user privacy have never been more important. Personal computers (PCs) typically offer an open architecture as an industry standard which can be used to build a ubiquitous computing platform. Trust in the platform, however, has not commonly been part of such designs. As used herein, the term "platform" can be taken to mean any type of device, including hardware, firmware, software, or any combination of these, whose activity is directed according to a plurality of programmed instructions.

There are many protocols that allow a set of members to participate as a group. This might be for the purpose of establishing a community group to communicate between one or all members simultaneously (e.g., members of the same family, organization, etc.) or a broadcast from a single member to all the other members of the group (i.e., multicast; e.g., an on-line lecture, distribution of a common message to a group of employees, etc.). Examples of such protocols include the Real-time Transport Protocol (RFC 3550, also known as RTP) and the Secure Real-time Transport Protocol (RFC 3711, also known as SRTP).

RTP is a protocol for sending a stream of data between endpoints. This can be point-to-point or multicast in nature. RTP is actually two protocols: one for the data stream (also called RTP) and other for controlling the RTP called the Real-time Transport Control Protocol (RTCP). Each instantiation of communication between end points is a session. However, the base protocol provides simple, but optional protection of the data stream within a session.

SRTP adds a defined mechanism to protect either the session's RTP data stream itself, the session's RTCP, or both. In general, this mechanism uses an encryption key, called a session key, which is unique for the RTP session. SRTP provides for a mechanism to change or "roll" the session key during the RTP session. SRTP defines mechanism and methods for deriving the session key from a Master Key. The Master Key is identified by a Master Key Identifier (MKI), which is not a secret value but is used by a Key Management Component.

The Master Key is a random set of bits that is kept secret amongst the members of the group because session keys are derived from the master key. One member of the group is required to create the Master Key, however, as disclaimed in the RFC's, the distribution mechanism is outside the scope of the current standards. Furthermore, the SRTP draft specifically states that distribution and association of the MKI with an actual Master Key is outside the scope of the SRTP draft and is left for subsequent work.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for group session key and establishment using a certified migration key are described. In one embodiment, the method includes exporting of a protected certified migration key (CMK) to a target platform. In one embodiment, exporting of the protected CMK requires that the target platform is authorized for participation in a group for participation in a secure group communication session. In accordance with such an embodiment, the target platform is also required to meet a group security policy by having a storage key, including attributes that comply with the group security policy. Once the protected CMK is exported, in one embodiment, a group master key is encrypted with a public portion of the CMK to form a protected group master key. Subsequently, the protected group master key is transmitted to the target platform. In one embodiment, possession of the group master key enables the target platform to derive a session key used to encrypt content transmitted between the groups during a secure group communication session.

In the following description, certain terminology is used to discuss features of the present invention. For example, a "platform" includes any product that performs operations for subsequent analysis and verification of the platform's operations. Examples of the platform include, but are not limited or restricted to a computer (e.g., desktop, a laptop, a server, a workstation, a personal digital assistant or other held-held, etc.); communication equipment (e.g., wireless handset, facsimile, etc.); a television set-top box and the like. A "link" is broadly defined as one or more information-carrying mediums such as electrical wire, optical fiber, cable, trace, or even a wireless channel using infrared, radio frequency (RF), or any other wireless signaling mechanism.

In addition, the term "information" is defined as one or more bits of data, address, and/or control. A "software module" includes code that, when executed, performs a certain function. Examples of a software module include an application, an applet, or even a series of code instructions, possibly a subset of code from an applet, acting as a lesser sized software module.

A "cryptographic operation" is an operation performed for additional data security. For example, one type of cryptographic operation involves digital signing information to produce a digital signature. This digital signing operation may be in accordance with Digital Signature Algorithm (DSA). Another type of cryptographic operation involves hashing, namely a one-way conversion of information to a fixed-length representation. Often, this representation, referred to as a "hash value" or an "identifier", is substantially less in size than the original information. It is contemplated that, in some cases, a 1:1 conversion of the original information may be performed.

System

Figure 1:
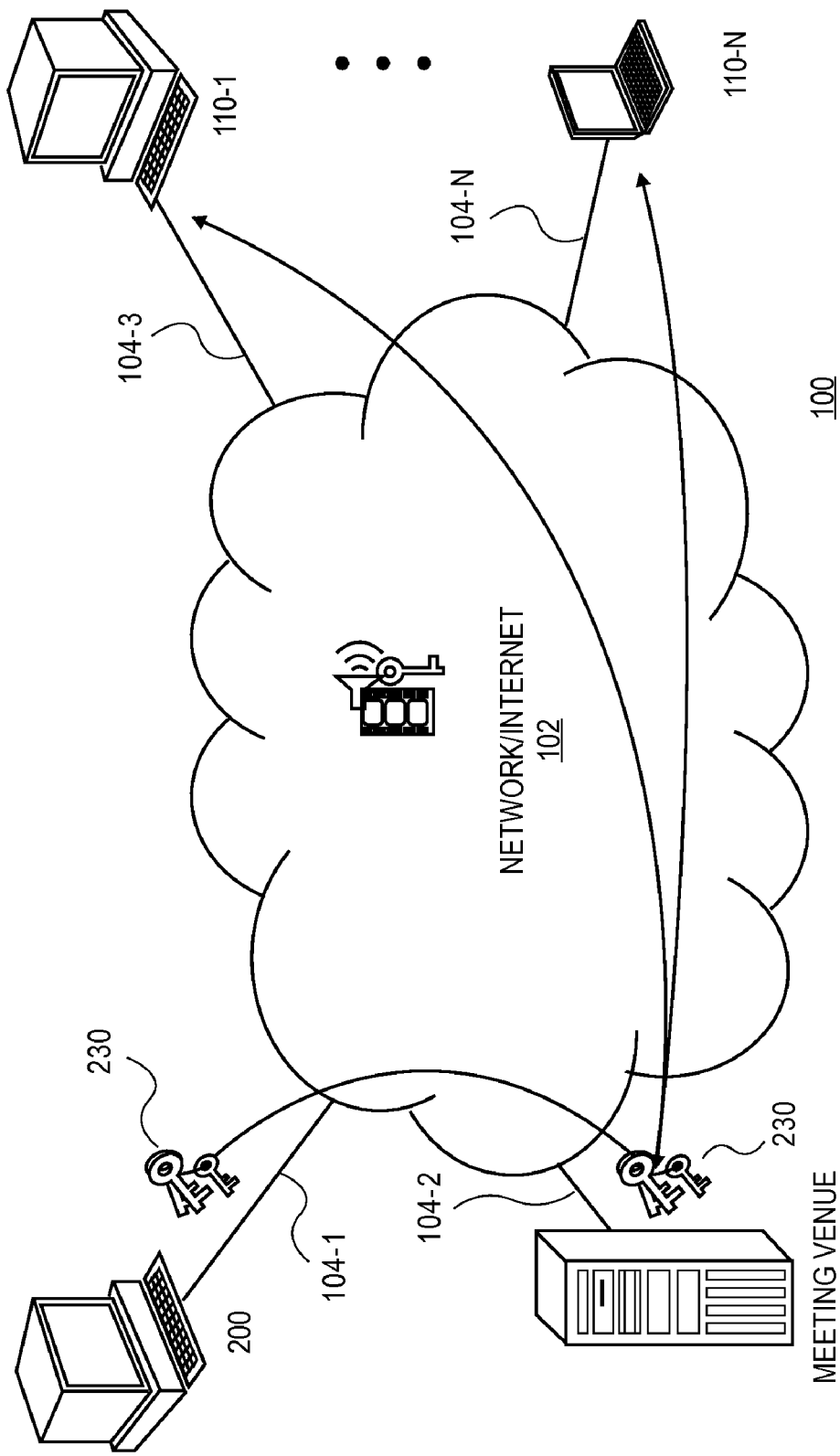
FIG. 1 is a block diagram illustrating a network environment for establishing a secure group communications session, in accordance with one embodiment.

FIG. 1 is a block diagram illustrating a network environment 100 for establishment of a secure group communications session, in accordance with one embodiment. Representatively, member platforms 110 (110-1, . . . , 110-N) are coupled to a network 102 via communication links 104 (104-3, . . . , 104-N). In one embodiment, network 102 may include a local area network (LAN), a metropolitan area network (MAN), a wide area network (WAN), such as the Internet or other like communications medium for coupling computer platforms together for communication there between.

Also coupled to network 102 are session organizer platform 200 and meeting venue server 150. In the embodiment illustrated, the establishment of a secure group communications session requires client platforms 110 to provide sealed storage of a group master key pair 230 for which a session key is derived for performing encryption of streamed content to provide a "secure group communications session." In one embodiment, session organizer platform 200 and member platforms 110, as well as meeting venue server 150 include a trusted hardware device (THD).

The Trusted Computing Group (TCG) has developed a standard to provide the industry with a set of operation conditions that enables trust in computer platforms and environments. In accordance with a TCG Specification entitled "Main Specification Version 1.2," published on Apr. 28, 2004, each personal computer (PC) is implemented with a trusted hardware device referred to as a Trusted Platform Module (TPM). In one embodiment, the THD of session organizer platform 200, group member platforms 110 and meeting venue server 150 is a TPM, as defined by the TCG Specification.

As further described by the TCG Specification, there are also two types of keys: Signature and Storage. Signature keys are used to digitally sign values either within the TPM (e.g., properties of a key current loaded, integrity metrics, etc.) or presented by external entities (e.g., an external authorization required to verify the owner of the platform is who they claim they are). Storage keys are used to encrypt either key data (i.e., are used as Parent Keys) or encrypt external data using operations such as TPM_Seal and TPM_Unbind.

Figure 2:
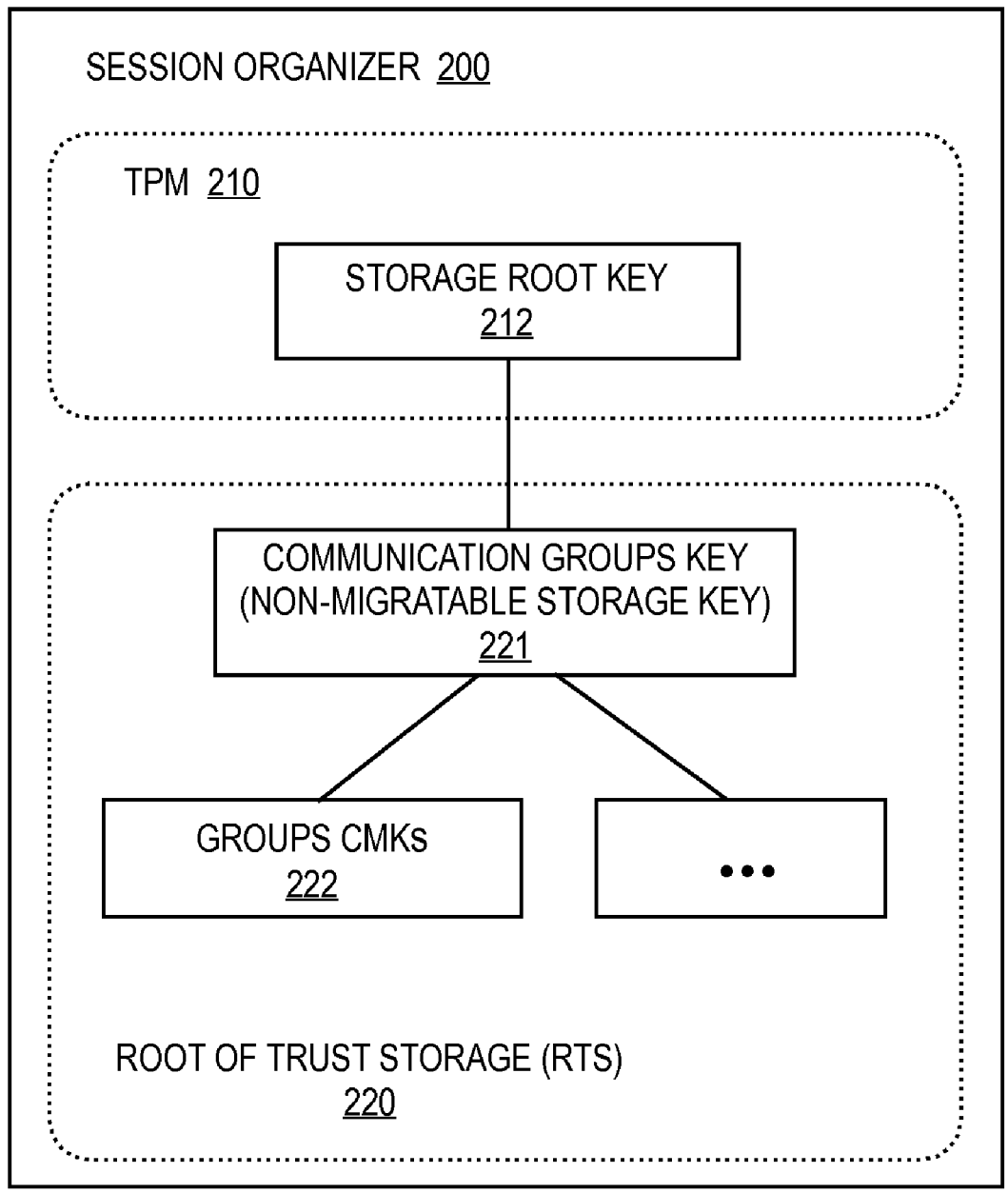
FIG. 2 is a block diagram further illustrating a session organizer platform, as illustrated in FIG. 1, in accordance with one embodiment.

FIG. 2 is a block diagram further illustrating session organizer platform 200 of FIG. 1, in accordance with one embodiment. Representatively, trusted platform module (TPM) 210 provides a key hierarchy with a key known as the Storage Root Key (SRK) 212 residing at the top of the hierarchy or root of the tree. Any operation on a key protected by TMP 210 ("TPM keys") may require presentation of authorization data to the TPM 210 along with the command and its parameters (e.g., the authorization data is often a hash of a pass-phrase). This authorization data is created by the entity that causes the key to be created and is inserted into the key data blob using a particular protocol. This includes the SRK 212, for which an entity known as the TPM Owner assigns the authorization data.

As further illustrated in FIG. 2, session organizer platform 200 includes roots of trust storage (RTS) 220. The proposed behavior of a TCG enabled device requires roots of trust or components that must be trusted because misbehavior of such components may not be detected. As defined by the TCG, there are commonly three roots of trust in a trusted platform: a root of trust for measurement (RTM), a root of trust for storage (RTS) and a root of trust for reporting (RTR). The root of trust for storage, or RTS 220, protects keys and data entrusted to TPM 210. The RTS 220 manages a small amount of volatile memory where keys are held while performing signing and decryption operations. Inactive keys may be encrypted and moved off-chip to make room for other more active keys.

Hence, it is important to understand that all keys do not reside with the TPM 210 simultaneously. Rather, when they are created, they are assigned a parent storage key. The parent key is used to encrypt private components of the new key so it can be stored outside the TPM 210 as a "key blob" and remain protected. When needed, the key blob is reloaded and decrypted by the same parent key using operations such as TPM_Loadkey. A single parent key can protect any number of Child Keys and these child keys may have no relation to each other except that they are protected by the same Parent Key. However, an association may be created by the fact that the same Parent Key protects all of them; therefore, the authorization data required to use the Parent Key is required to load it's Child Keys.

A TPM_Seal operation is where the external data is presented to the TPM, and in different operations, the TPM encrypts the external data using the public part of a storage key. The primary security property of this operation is the data "sealed" is available only on the specific platform containing the Storage key because the TPM will not perform the seal or unseal operation using a migratable key. The TPM_Unbind operation decrypts, using the private part of a key, a blob that was encrypted by an entity outside the TPM using the associated public key. It is important to note that in both the "seal" and "bind" operations, the contents of the data to be operated upon are opaque to the TPM; i.e., the TPM does care or peek at the data.

Referring again to FIG. 2, RTS 220 includes communication group key 221. In one embodiment, group key 221 is created by the session organizer platform 200 as a storage key for the group, such as, for example, including group member platforms 110, as shown in FIG. 1. As shown in FIG. 2, group key 221 is a non-migratable storage key. According to the TCG Specification, there are three classes of keys: Migratable Keys; Non-Migratable Key and Certified Migratable Keys (known as CMK). Non-Migratable Keys have the property that there is no operation that will allow the private part of the key to be exported. Migratable keys have the property that the TPM Owner is allowed to "export" the private component of the key to another entity which is likely another TPM. The input to this operation is the public key of the entity to receive the exported key. Presumably, the TPM Owner understands the security properties of the target entity and follows the policies dictating the use and distribution of the migratable key but there is no enforcement of that policy.

Referring again to FIG. 2, session organizer platform 200 creates a certified migration key (CMK), referred to herein as a "group CMK" 222 and distributes the group CMK to platforms that are authorized to be part of the group, such as, for example, group member platforms 110, as shown in FIG. 1. As described by the TCG Specification, Certified Migratable Keys (CMKs) are a hybrid of Migratable Keys in that the TPM enforces the destination policy for the CMK. During the CMK creation operation, one of the parameters passed in is a list of authorized Migration Authorities. This creates the migration policy for the CMK because the TPM will not export the CMK to entities other than those contained within the original Migration Authority list.

Figure 3:
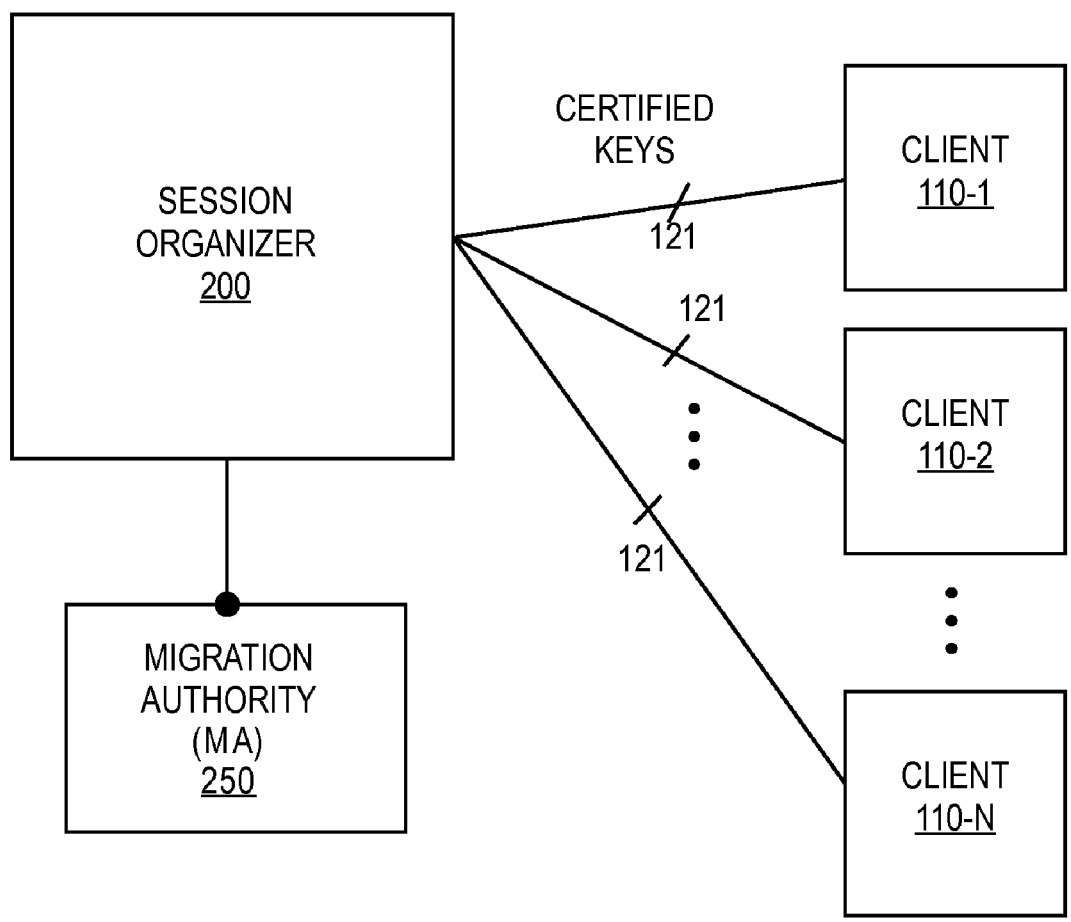
FIG. 3 is a block diagram further illustrating the session organizer of FIG. 2 for establishment of the secure group communications session, in accordance with one embodiment.

FIG. 3 is a block diagram further illustrating session organizer platform 200 and group platforms 110, in accordance with one embodiment. Representatively, session organizer platform 200, following creation of group CMK 222, authorizes the use of migration authority (MA) 250, which may be referred to herein as a "group manager platform." For example, in the embodiment illustrated in FIG. 1, meeting venue server 150 may be selected as a migration authority 250 or group manager platform.

Representatively, session organizer platform 200 may retrieve group storage keys 121 of group member platforms 110. In one embodiment, certified storage keys 121 are created by client platforms 110 and are analogous to group key 221 created by session organizer platform 200, as shown in FIG. 2. In one embodiment, session organizer platform 200 uses group storage keys 121 to define a group list 224. Furthermore, because the group storage keys 121 are certified storage keys protected by, for example, a TPM of member platforms 110, session organizer platform 200 can certify that the group storage keys 121 are protected by the member platform's TPM.

Figure 4:
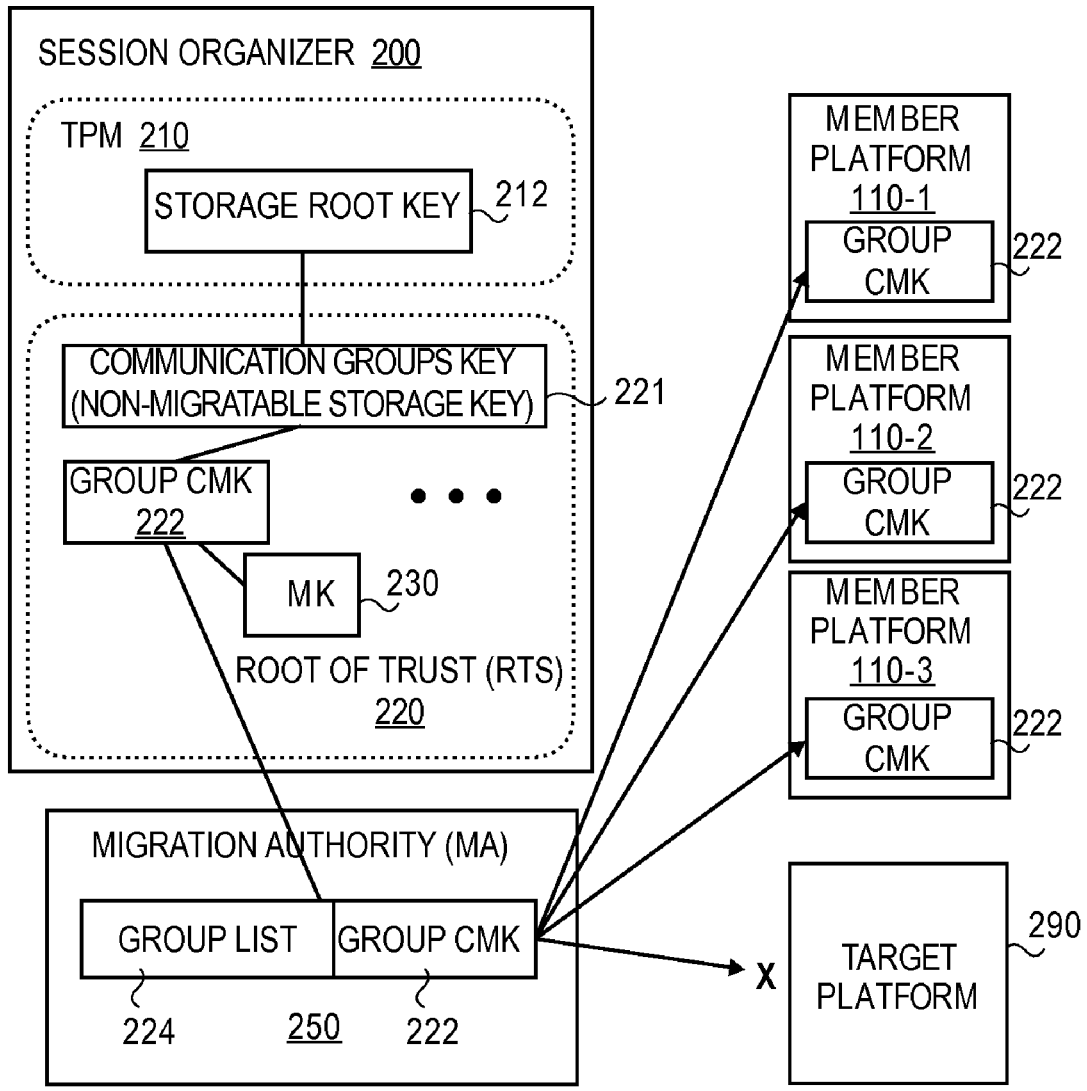
FIG. 4 is a block diagram further illustrating the elements of FIG. 3, in accordance with one embodiment.

FIG. 4 is a block diagram further illustrating session organizer 200, migration authority 250, group member platforms 110, as shown in FIG. 3, and non-group member (target) platform 290 in accordance with one embodiment. Representatively, session organizer platform 200 creates group CMK 222 for group list 224. In one embodiment, the group CMK 222, along with group list 224, are passed to migration authority 250. In accordance with one embodiment, migration authority 250 securely transmits group CMK 222 to group member platforms 110 that are listed in group list 224.

Referring again to FIG. 1, in accordance with one embodiment, meeting venue server 140 operates as a migration authority, such that session organizer platform 200 and client platforms 110 each contain group CMK 122/222 within sealed storage of their respective TPM. In accordance with such an embodiment, meeting venue server 140 is responsible for creating and managing the session encryption keys for the secure group communication session between session organizer platform 200 and member platforms 110.

As described above, secure real time transport protocol (SRTP) defines a mechanism that uses an encryption key, referred to as a "session key," which is unique for the secure group communications session. The SRTP defines mechanisms and methods for deriving the session key from a master key, which is identified by a master key identifier (MKI), which is a non-secret value that is used by a key management component. In the embodiments described, it is assumed that there is a one-to-one relationship between a single master key and a particular group. In the embodiments described, each member of the group needs the master key 230 to decrypt and thus participate in sessions derived from the master key. Accordingly, in one embodiment, group CMK 222, which may be distributed to each group member platform 110 is used to securely transmit a master key, referred to herein as a "group master key" 230 to each group member platform 110.

In one embodiment, once the group CMK 222 is distributed to a target platform (e.g., member platform 110-1), any member 110 possessing the master key 230 (i.e., any member of the group) can encrypt the master key with the public portion of the group CMK and send the encrypted master key blob to the target platform. As will be recognized, since the target platform contains the private portion of the group CMK 222 in sealed storage, the target platform may decrypt the master key blob and use the master key blob to derive the session key and begin participation in the secure group communications session.

However, in the embodiment listed in FIG. 1, in one embodiment, the meeting venue server 150 may derive a group session key from master key 230 and encrypt a data stream transmitted to session organizer 200 and group member platforms 110 using the session key derived from the group master key 230. In one embodiment, meeting venue server 150 may encrypt the group session key using the group CMK 222 and transmit an encrypted group session key in conjunction with the encrypted content to the group member platforms 110 and session organizer platform 200. Accordingly, session organizer platform 200 and group member platforms 110 decrypt the received session key using a private portion of the group CMK. Once the session key is decrypted, the session key may be used to decrypt the received encrypted content stream for participation in the secure group communication session.

Accordingly, assuming there is an association between the user and the group member platform, this provides a secure mechanism to distribute master key 230 using a group CMK 222 to users on the platform that are authorized to participate in the group. An example of application is a sales force participating in a briefing on a new technology. The company does not want the material to be exposed on platforms that are not authorized, such as notebook computers that are assigned to each salesperson by the company. Here, the company would distribute the group CMK 222 to those platforms that are purchased and issued to those particular salespersons authorized to participate in the briefing. In one embodiment, use of group CMK 222 requires authorization data. By requiring authorization, this method can utilize the same TPM/platform to protect different users on that same platform.

Figure 5:
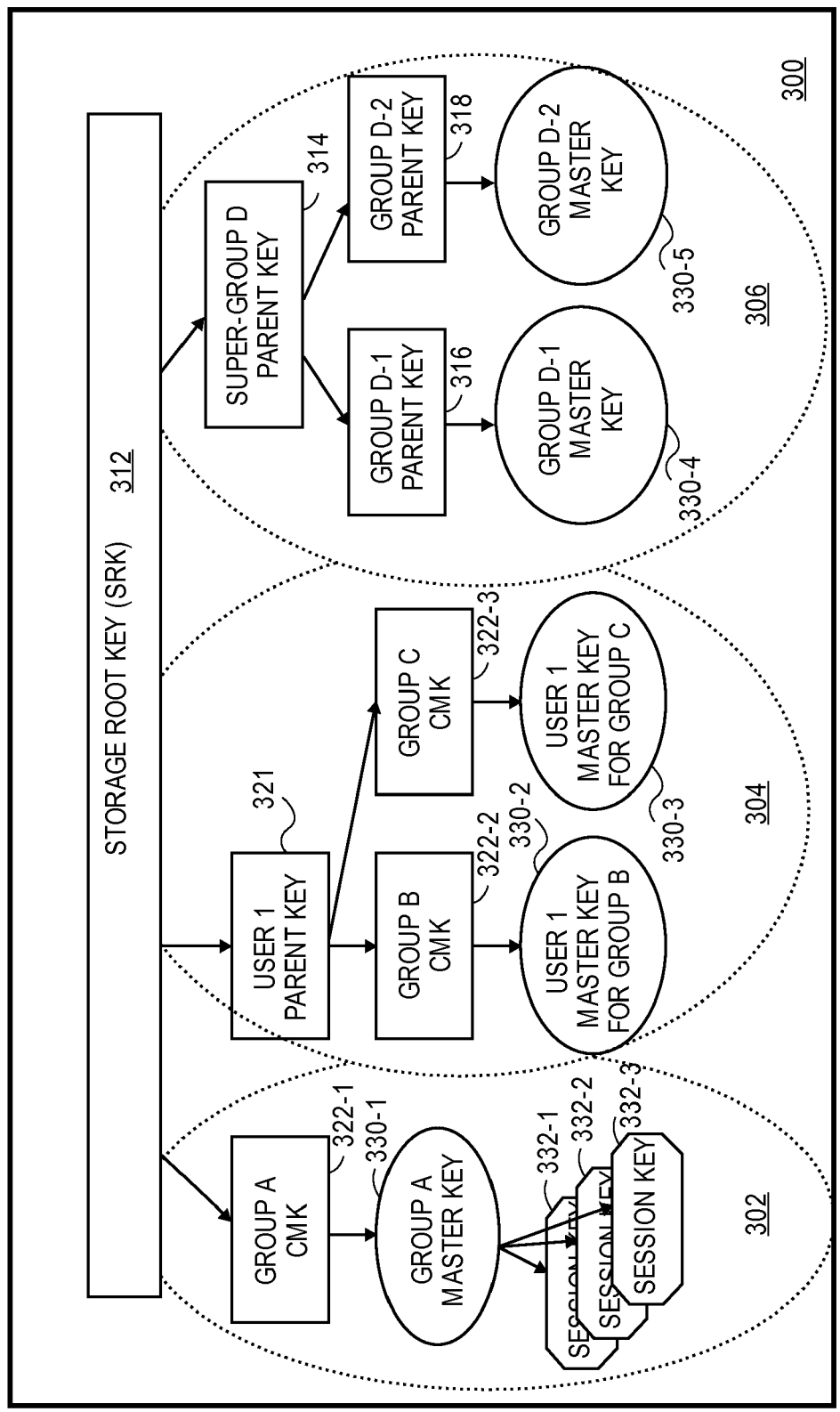
FIG. 5 is a block diagram illustrating example key hierarchies, in accordance with one embodiment.

FIG. 5 is a block diagram 300 illustrating possible example key hierarchies (302, 304, 306) for establishment of group CMKs 322 (322-1, 322-2, 322-3) and group master keys 330 (330-1, 330-2, 330-3, 330-4), in accordance with one embodiment. Representatively, to provide more granularity and control, especially to multi-user platforms, the group CMK 322 can be placed under a storage key that is either associated with a larger group (example 306) or a particular user (example 304) on a multi-user platform.

For example, under the SRK 312, there may be several storage keys acting as parent keys for one or more group CMKs. As they keys may not be distributed, they may be non-migratable keys. However, they also may be migratable keys if the parent key is a super group, as shown in example 306. It should be noted that it is not necessary to use the TPM'S SRK as the root of this hierarchy. The SRK is used here for simplicity. Any non-migratable key can be used allowing for what is the root key in this diagram to be further down the TPM's key hierarchy.

An example of a super group (example 306), in accordance with one embodiment, may consist of all persons with a company. In this case, the sales department would distribute the salesperson's group CMK to only the super group parent key 314. This granularity can be extended to allow for many groups under a common, or set, of parent keys. This would, for example, allow a single parent key 314 to contain more than one group (316, 318), each representing a different function. This would apply if a person was a member of multiple groups, such as a salesperson group and a technical staff. Each of these would be a separate key, each with their own group CMK, but both group CMKs would be under the company's collaboration parent key 314.

Referring again to FIG. 5, example 302 represents a simple implementation, in accordance with one embodiment. Representatively, Group A's CMK 322-1 is placed directly under the SRK 312. Here, the Group A master key 330-1 is protected by the Group A CMK 322-1 and no further hierarchies are shown. It should be noted that in the example protocol (i.e., RTP), the master key 330-1 is not used to protect session data, rather the master key 330-1 is used to derive session keys 332 (332-1, 332-2, 332-3) using a well-known protocol. These session keys 332 are used during the session to protect session data.

In example 304, a more complex scheme is shown, where a single user (User 1) belongs to two groups: Group B and Group C. The user parent key 321 is not protecting a group master key. As a result, the parent key 321 is not required to function as a group CMK 322. In fact, it may be desirable that the parent key 321 is a non-migratable key, although this is not required. In other usages, however, it may be a group CMK if it is also to be a parent key of a higher level group than Group B or Group C. While not shown, other users of a platform would have their own peer hierarchy to that of User 1. It is also possible to invert the hierarchy of the groups and the users, such that directly under the SRK 312 (or their parent key) would be a group parent key. Under that group parent key would be user group CMKs. This would represent a scenario where multiple users of the same platform share a common group, but each requires their own log-in, for example.

Example 306 represents a more complex configuration where super groups 314 are implemented. As indicated above, a super group is implemented where a user belongs to multiple groups, such as a salesperson group (e.g., Group D-1) and the technical staff group (e.g., Group D-2). Other groups could, of course, be added, such as a corporate ride group. Another use for this is to allow a separation of the master keys (330-4, 330-5) for the session data and the control protocol (e.g., RTCP). In this case, Group D-1 master key 330-4 would be used to establish the session key for the session data and the Group D-2 master key 330-5 could be used to establish the session key for the RTCP data.

Figure 6:
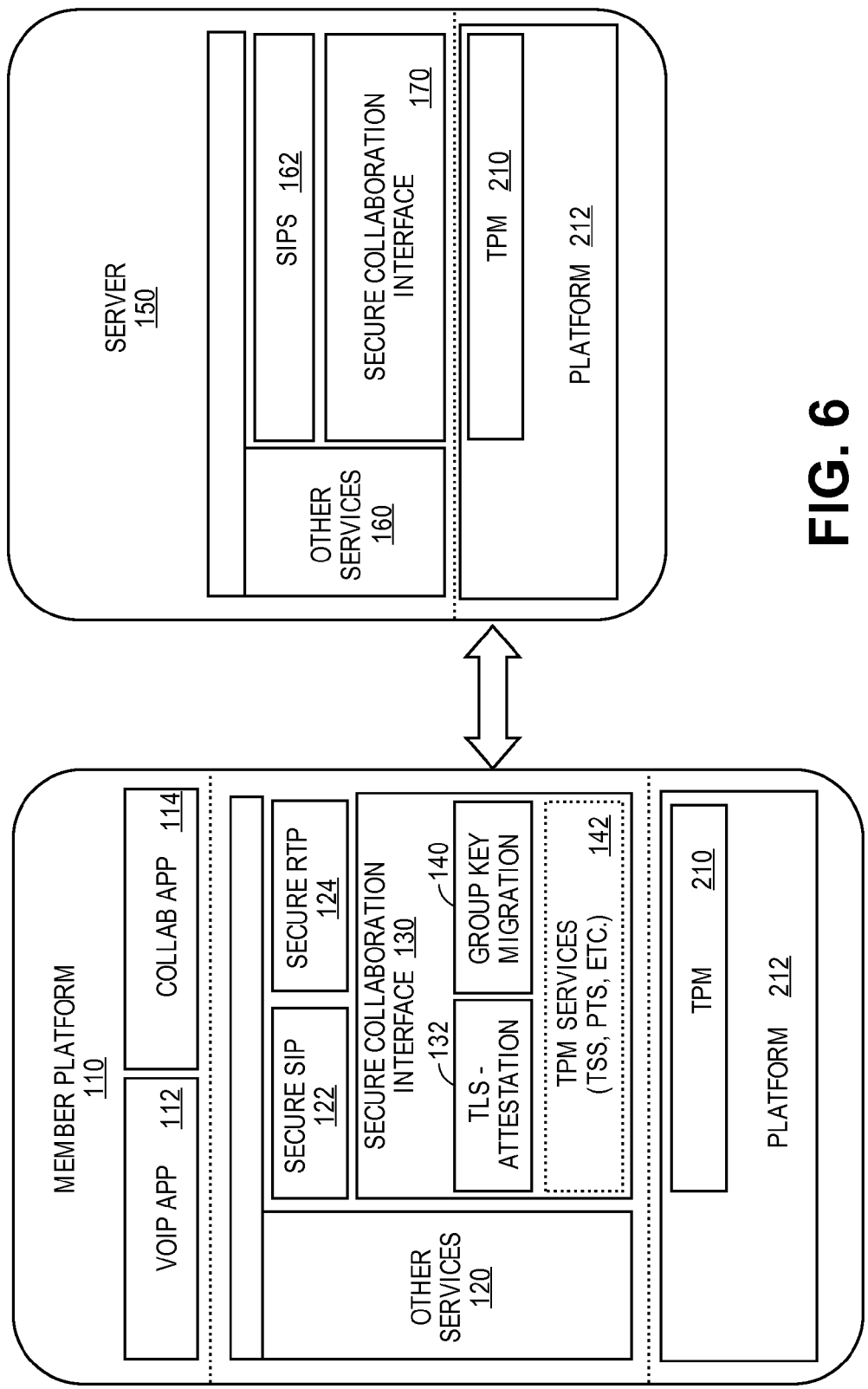
FIG. 6 is a block diagram further illustrating a member platform and server platform, as illustrated in FIG. 1, in accordance with one embodiment.

FIG. 6 is a block diagram further illustrating group member platforms 110 and server platform 150 (e.g., group manager 250), in accordance with one embodiment. Representatively, group member platforms 110 may include voice over Internet Protocol (IP) (VOIP) applications 112 and collaboration (COLLAB) applications (App) 114 within a client user space to support VOIP App 112 and COLLAB App 114. In addition, member platform 110 includes secure session initiation protocol (SIPS) components 112 and SRTP component 124. As illustrated, components may include a secure collaboration interface 130, such as a transport layer security (TLS) attestation 132 and group member key migration 140. Also shown are TPM services 142, including TSS (TCG software stack), PTS (platform trust services) and the like. Also shown is a TPM 210 and platform 212 of member platform 110.

FIG. 6 further illustrates meeting venue server 150, which may include a secure session initiation protocol (SIPS) components 162 and secure collaboration interface 170 for providing the secure group communication session with group member platforms 110. Also shown is TPM 210 and platform 212 of meeting venue server 150.

Referring again to FIG. 4, a non-member platform, such as target platform 290, is not able to view the encrypted content stream transmitted to the various group member platforms 110. Furthermore, target platform 290 is unable to decrypt the encrypted content stream since the target platform 290 does not possess group CMK 222 or group master key 230. In one embodiment, either group manager 250 or a group member platform 110 may invite platform 290 to participate in the group. Procedural methods for implementing one or more embodiments are now described.

Operation

Figure 7:
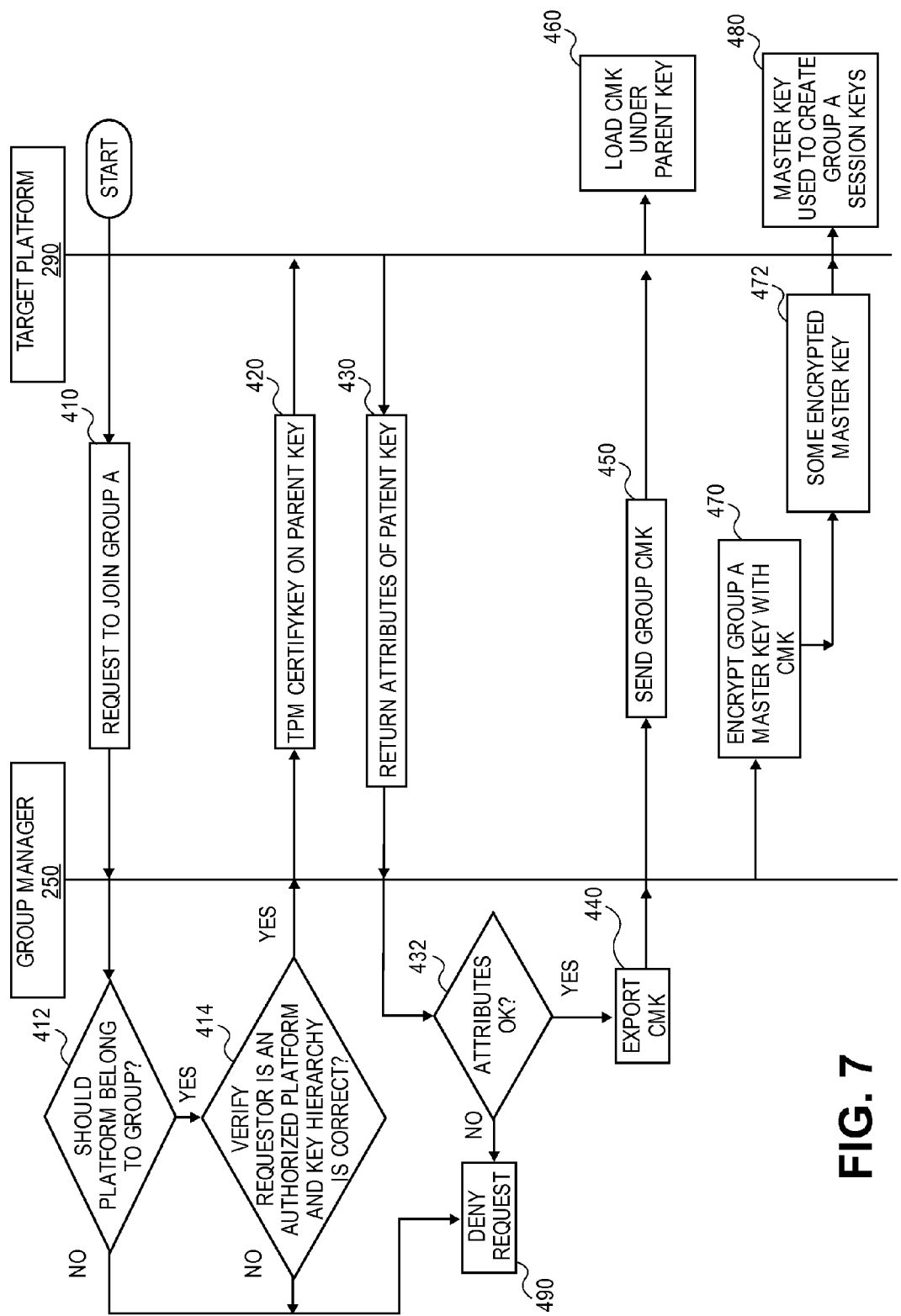
FIG. 7 is a flowchart illustrating distribution of a group master key using a certified migration key (CMK), in accordance with one embodiment.

Turning now to FIG. 7, the particular methods associated with embodiments of the invention are described in terms of computer software and hardware with reference to a flowchart. The methods to be performed by a computing device (e.g., a storage) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems.

Referring again to FIG. 7, FIG. 7 is a flowchart illustrating a method 400 for establishment of a group session key using a certified migration key to enable a secure group communication session, in accordance with one embodiment. The embodiment illustrated in FIG. 7 will be described with reference to the group member platforms 110, target platform 290, session organizer platform 200, migration authority 250, and meeting venue servers 150, as illustrated with reference to FIGS. 1-4. Accordingly, as shown in FIG. 7, an example is described for distribution of a group CMK 222 and a group master key 230 to enable a non-member platform (target platform) 290 to join the group and begin participation in a secure group communication session, in accordance with one embodiment.

Although described with reference to the RTP and SRTP protocols, other protocols are possible for providing a target platform 290 with the necessary keys to enable participation in a secure group communications session. In the embodiments described, the group manager platform 250 may be an automated process on a trusted platform. In the embodiments described, it is not necessary for the group manager 250 or its platform to participate in the actual session. In the embodiments described, the role of the group manager 250 is simply to verify that platforms and their keys are valid and meet the policies of the requested group referred to herein as a "group security policy." Once verified, the group manager 250 acts as the key distributor by becoming the CMK migration authority, for example, as shown in FIG. 2.

Referring again to FIG. 7, at process block 410, a target platform 290 may issue a request to join a Group A. While shown as the target platform 290 making this request, in one embodiment, a group member platform may initiate the request by issuing an invitation to the target platform 290. In the embodiment described, the request issued by the target platform 290 may include unverified information, such as a name of the requesting user, an identity of the platform, an identity of the parent key 121 selected by the target platform as a parent key of the CMK and the name of Group A, as well as other like information.

Referring again to FIG. 7, at process block 412, the group manager 250 may determine target platform 290 is authorized for membership within Group A. In one embodiment, the group manager 250 performs verification of the user and platforms authorization for membership within Group A. In one embodiment, group manager 250 performs such verification by accessing a local, or remote, database (e.g., a directory) to see if the user and platform 290 are authorized for membership within Group A. Alternatively, the group manager 250 may send a message, such as an e-mail, to a human group administrator to verify authorization of the user and platform 290 for membership within Group A.

Once the group manager verifies authorization of the platform 290 to become a member of Group A, at process block 414, the group manager determines an ID of the parent key 221 selected by the target platform 290 to function as a parent key of the group CMK 222. Once determined, at process block 420, the group manager 250 may issue a key certification request based on the ID of the parent key 221 selected by the target platform 290. In one embodiment, this is performed by issuing a TPM certify key command to the target platform 290 based on the parent key 221. Accordingly, in the embodiment described, the use of a group CMK 222 to distribute a group's master key 230 is made more secure and useful if an authority of the group (e.g., the group's manager 250) has confidence that the group CMK is actually associated with the desired target platform 290.

In one embodiment, key certification is performed as illustrated with reference to process block 420, by issuing a TPM certify key to the target platform 290. As described by the TPM Specification, the TPM_CertifyKey2 command is provided for operation onto CMKs. Accordingly, in the embodiments described, this operation allows group manager 250 (or any entity) to challenge a TPM or other trusted hardware device within the target platform 290 to provide attributes of the parent key protected by the TPM. Accordingly, using the key certification command, a group manager can "challenge" the target platform by issuing the key certification command to the target platform 290.

As shown in FIG. 7, the target platform identifies the parent key 221 used for the group CMK 222 to group manager 250. The group manager 250 then issues the key certification request to the parent key 221 specified by the target platform 290. Representatively, at process block 430, the target platform returns attributes of the parent key 221, which are signed by the target platform 290 using a target platform certification key. At process block 432, the group manager 250 would compare the attributes (e.g., association with a particular platform that is issued by the company) against a group security policy. Accordingly, if the attributes of the parent key 221 comply with the group security policy, at process block 440, group manager 250 exports the group CMK 222.

Once group CMK 222 is exported, a protected version of the group CMK 222 is transmitted to the target platform 290, at process block 450. In one embodiment, the group CMK is protected by encrypting the group CMK 222 using a public portion of the parent key 221. Subsequently, at process block 460, the target platform 290, loads the CMK 222 under the parent key 221 by first decrypting the protected CMK 222 using the parent key 221. In one embodiment, exporting of the Group A CMK 222 is performed by the group manager 250. However, in an alternative embodiment, this operation may be performed by a member of the group that is currently online at the request of the group manager 250. Accordingly, in the embodiment described, the group CMK 222 is encrypted by the group manager 250 using the public portion of the target platform's parent key 221.

Accordingly, once the target platform 290 contains the group CMK 222 in protected storage, at process block 470, any group member platform 110 may encrypt the Group A master key 230 with a public portion of the group CMK 222. In an alternative embodiment, these activities may be performed by the group manager 250. Once encrypted, at process block 480, the encrypted master key 230 may be transmitted to the target platform 290. Accordingly, at process block 490, the target platform 290 may decrypt the master key 230 using the private portion of the group CMK 222 and load the master key 230 under the group CMK 222.

In one embodiment, transmission of the encrypted master key 230 to the target platform 290 may be performed using one of many methods. In one embodiment, the encrypted master key is transmitted to the target platform in an RTCP packet. This allows any new member of the group (target platform 290) to begin participating after receiving the group CMK 222 and upon receipt of the first RTCP packet that contains the group master key 230. However, in an alternative embodiment, for example as shown in FIG. 1, the meeting venue server platform 150 may include encrypted group session keys 232 using the public portion of the group CMK 222 with an encrypted stream transmitted during the group communication session. Accordingly, the target platform using the private portion of the group CMK 222 may decrypt the session keys 232 and use the decrypted session keys 232 to decrypt the received encrypted content stream.

In an alternative embodiment, the use of multiple group CMKs may be provided on multi-user platforms. In accordance with such an embodiment, each user can have their own parent key. Using this structure, the group manager 250 can verify not only that the parent keys are associated with the user's platform, but using out-of-band techniques, the group manager 250 can verify that the parent keys are associated with a particular user on that platform. Accordingly, the knowledge that a session key can only be established by authorized platforms is one benefit of the group CMK.

In a further embodiment, additional optional authorization data may be required for use of group CMKs 222. In accordance with such an embodiment, this authorization data is typically a hash of a pass phrase and some salt value. However, in an alternative embodiment, additional sources of user or unique values, such as having the authorization data contained within a smart card, are possible. This provides assurance that the session is restricted to an authorized platform but because the user is required to enter a pass phrase, the session is also sent only to the user.

In one embodiment, communication group keys 221 can have platform configuration associated with them as well. In one embodiment, adherence to this restriction may be verified by the venue server 150 (or other entity distributing key 222) using a key certification operation. Accordingly, the association of platform configuration to group keys 221 allows not only restriction of the key to valid platforms, but to valid platforms running in a valid configuration (e.g., agreed to OS, applications, virus scanners, etc.).

Accordingly, the use of group CMKs 222 restricts the target platforms 290 to only those authorized to participate in the group. This mechanism can be used to enforce the policy that the TPM will not transfer a CMK directly to another peer TPM. The nature of a CMK allows for the requirement of a trusted third party to enforce master key distribution. When a group CMK is initially created, the group manager platform 250 is designated at the migration authority. The group manager's platform does not have to be attended or even associated with the human. This function can be fully automated.

Any platform within the group can initiate the process of bringing a new target platform into the group by contacting the group manager 250. The group manager 250 verifies that the platform meets the group security policy and sends the group CMK 222 to the new target platform 290. Since any platform within the group can participate in the group sessions, any platform can now send the group master key 230 to the new target platform by encrypting the group's master key using the public part of the group CMK 222 (referred to as a "bind operation") and send the encrypted group master key 230 to the new target platform 290, which can now perform a TPM_Unbind operation to retrieve the group's master key 230.

In the embodiments described, there may be more than one master key under a group CMK. This allows for more refined resolution of sessions (e.g., one master key for each subgroup), where security within a group and between subgroups within the group is not a concern. In one embodiment, this may be used in some environments because there is some overhead associated with the verification of the group storage keys in creation of the group CMK. In this case, all that is secure is membership in the overall group and not membership in a particular subgroup. Accordingly, in the embodiments described, once the target platform has received the group master key, the target platform may place the group master key in the target platform's key manager. From there, it may remain protected by the group CMK or the key manager may protect it using other means, such as using a TPM_Seal operation. Whatever method is used, the master key identifier (MKI) for each session may refer to either the group CMK or the group master key or reference a combination thereof for derivation of a session key for participation in a secure key communication session.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having disclosed embodiments and the best mode, modifications and variations may be made to the disclosed embodiments while remaining within the scope of the embodiments as defined by the following claims.

What is claimed is:

1. A method comprising: exporting a protected certified migration key (CMK) to a target platform if the platform is authorized to participate in a group and meets a group security policy; encrypting a group master key with a public portion of the CMK to form a protected group master key; and transmitting the protected group master key to the target platform.

2. The method of claim 1, wherein exporting further comprises: verifying that the platform is authorized for participation in the group; requesting signed attributes of a key selected by the target platform as a parent key of the CMK if the platform is verified as authorized to participate in the group; comparing signed attributes received from the target platform against the group security policy; and encrypting the CMK with a public portion of the parent key of the target platform if the signed attributes meet the group security policy to form the protected CMK.

3. The method of claim 1, wherein prior to exporting, the method further comprises: exporting the group CMK to a trusted group manager; creating, by the trusted group manager, the group master key; and responding to request a from the target platform to join the group.

4. The method of claim 1, further comprising: encrypting a data stream according to a session key derived from the group master key; encrypting the session key using the group CMK; and transmitting the encrypted data stream, including the session key, to the platform and at least one group member platform.

5. The method of claim 1, wherein the protected group master key is transmitted to the target platform by a group member platform.

6. A method comprising: providing, according to a key certification request from a group manager, signed attributes of key selected by a target platform as a parent key of a certified migration key (CMK) held by the trusted group manager; receiving the CMK from the group manager if the signed attributes meet a group security policy; and participating in a group communications session with at least one group member platform by decrypting an encrypted data stream using a session key received with the encrypted stream and protected by the CMK.

7. The method of claim 6, wherein prior to providing the signed attributes, the method further comprises: issuing, by the target platform, a request to the group manager to join a group; and receiving the key certification request if the target platform is authorized for participation in the group.

8. The method of claim 6, wherein receiving the CMK further comprises: decrypting the CMK according to the key selected by the platform as the parent key of the CMK; and loading the CMK under the selected parent key.

9. The method of claim 6, further comprising: receiving a group master key, wherein the group master key is encrypted with a public portion of the CMK; decrypting the group master key with a private portion of the CMK; and deriving a group session key from the master key to enable participation in a group communication session.

10. The method of claim 6, wherein participating in the group communication session comprises: receiving the encrypted group session key with encrypted content; decrypting the session key with a private portion of the CMK; and decrypting the encrypted content using the decrypted session key.

* * * * *